(12) United States Patent
Diachina et al.

(10) Patent No.: US 6,701,151 B2
(45) Date of Patent: Mar. 2, 2004

(54) SHORT ACCESS FOR REALIZING A SIGNALING RADIO BEARER IN GERAN

(75) Inventors: John W. Diachina, Garner, NC (US); Mathias Johansson, Sollentuna (SE)

(73) Assignee: Ericsson Inc., Research Triangle Park, NC (US)

( * ) Notice: Subject to any disclaimer, the term of this patent is extended or adjusted under 35 U.S.C. 154(b) by 301 days.

(21) Appl. No.: 09/818,827

(22) Filed: Mar. 27, 2001

(65) Prior Publication Data

US 2002/0187789 A1 Dec. 12, 2002

(51) Int. Cl.$^7$ ................................................. H04Q 7/00
(52) U.S. Cl. ................................ 455/452.1; 455/452.2; 455/466; 455/550; 455/450; 455/517; 455/452.1; 370/329; 370/528
(58) Field of Search ................................ 455/452, 466, 455/452.2, 450, 517; 370/329, 528

(56) References Cited

U.S. PATENT DOCUMENTS 6,487,184 B1 * 11/2002 Pecen et al. ................ 370/329
2002/0082033 A1 * 6/2002 Lohtia et al. ............... 455/517

FOREIGN PATENT DOCUMENTS

WO     WO 01/20924    *  3/2001    ............ H04Q/7/00

OTHER PUBLICATIONS

"Digital Cellular Telecommunications System (Phase 2+); General Packet Radio Service (GPRS); Mobile Station (MS)—Base Station System (BSS); Interface: Radio Link Control/Medium Access Control (RLC/MAC) Protocol (GSM 04/60 Version 8.3.1 Release 1999)," Oct. 31, 2000, ETSI, pp. 1–253.

* cited by examiner

Primary Examiner—Nay Maung
Assistant Examiner—Alan T. Gantt
(74) Attorney, Agent, or Firm—Coats & Bennett, P.L.L.C.

(57) ABSTRACT

An method of establishing a radio bearer (RB) resource in an RAN to support communication with a mobile terminal uses a radio bearer resource request message to expedite RB resource allocation. The mobile terminal transmits a packet channel access request message that uniquely identifies the access request type as a RB access request. The requested RB may be a signaling radio bearer (SRB), in which case the RB access request message may identify the specific type of SRB desired. More generally, the RB access request message identifies the access request type as a RB resource request, which is enough to alert the RAN that RB resources are required. The RAN then sends an uplink packet channel assignment and the mobile terminal specifies the RB resource details by transmitting RLC header information on the assigned uplink channel.

45 Claims, 9 Drawing Sheets

SHORT ACCESS FOR REALIZING A SIGNALING RADIO BEARER IN GERAN

BACKGROUND OF THE INVENTION

The present invention relates generally to radio access networks for mobile communication networks and, more particularly, to a signaling procedure to expedite access to the radio access network for radio resource control signaling.

Mobile wireless communication networks have achieved tremendous success in providing untethered voice communications but have had only limited success providing wireless data services. One obstacle for wireless data services is the limited peak data rates of second-generation wireless communication systems. Two of the most widely deployed communication standards, the Global System for Mobile Communications (GSM) and the Telecommunications Industry Association (TIA)/Electronics Industry Alliance (EIA) standard TIA/EIA-136, were both originally developed primarily for voice communications. Both the GSM and TIA/EIA-136 standards employ Time Division Multiple Access (TDMA) and circuit-switched technology and have limited data rates of about 9.6 kb/s.

To achieve higher data rates, General Packet Radio Service (GPRS) was developed as an extension of GSM and has been adapted for TIA/EIA-136 systems. GPRS employs variable-rate coding schemes and packet-switched technology to increase data rates to about 100 kb/s. However, still higher rates are needed to support web browsing and other popular applications. The target rate for third generation (3G) wireless services is 384 kb/s. Another limitation of GPRS is that it does not support voice services, which are still provided by the circuit-switched network. This service separation reduces potential spectrum efficiency gain resulting from multiplexing different services to the same radio channel.

The European Telecommunications Standards Institute (ETSI) has developed a new standard for GSM to support high rate data services. This new standard is known as Enhanced Data Rates for Global Evolution (EDGE). EDGE is an overlay for existing GSM systems and has been adapted for TIA/EIA-136 systems. One objective of EDGE is to provide voice services over the packet-switched network. EDGE systems employ higher-order modulation schemes and various link adaptations to obtain several hundred kb/s peak data rates. EDGE provides an evolutionary path from existing standards for delivering 3G data services in existing spectrum bands. EDGE allows rapid deployment, reuse of existing infrastructure in GSM and TIA/EAI-136 systems, as well as support for gradual deployment.

A GSM-EDGE radio access network (GERAN) uses two types of radio bearers in support of high rate packet data services: signaling radio bearers (SRBs) and user radio bearers (URBs). URBs are used to transmit user data (e.g., voice) from the mobile terminal to the GERAN. SRBs are used to transmit control signaling, such as radio resource control (RRC) messages, from the mobile terminal to the GERAN. The mobile terminal requires that the GERAN set up SRBs whenever a control signaling procedure, such as an RRC procedure, needs to be performed. Since control signaling is used extensively to establish, maintain, and terminate connections, an efficient mechanism is needed to minimize delays and reduce processing overhead associated with requesting and allocating control signaling (e.g., SRB) resources.

BRIEF SUMMARY OF THE INVENTION

The present invention provides an expedited method for mobile terminals to obtain needed radio bearer resources from a radio access network (RAN). A radio bearer access request message transmitted by a mobile terminal indicates the mobile terminal's need for radio bearer resources. The radio bearer access message may be a specific signaling radio bearer (SRB) resource request, or a generic radio bearer (RB) resource request.

SRBs are used for control signaling between a mobile terminal and a radio access network (RAN). The SRB-specific implementation of the RB access message comprises request type information identifying the access request type specifically as a SRB resource request, and further comprises resource type information identifying the specific type of SRB desired by the mobile terminal. This enables the RAN to make the necessary resource allocations to establish the specific type of SRB desired by the mobile terminal based on the single SRB access request message. SRB resource allocation delay is minimized because the mobile terminal transmits a single message, and radio resource control processing overhead at the RAN is reduced.

In the context of a GSM/EDGE RAN (GERAN), the SRB access request message permits an Iu-mode capable mobile terminal to secure the specific type of SRB resource desired with a single message transmission on a shared packet channel resource. The 8 and 11-bit packet channel access request messages defined for GERAN may be modified to serve as SRB access request messages by including bit values specifying the message type as a SRB access request message, and additional bit values specifying the specific type of SRB desired.

By implementing the SRB access request message within the structure of the defined 8 and 11-bit packet channel access request messages, the SRB access request message is well suited to the contention-based RAN access procedures employed on the packet random access channels (PRACH) defined for GERAN. On a PRACH, many mobile terminals may be simultaneously competing for access to the RAN. Both the 8 and 11-bit versions of the SRB access request message complement operation in the bandwidth limited environment of a PRACH, where there may be limited opportunity for the mobile terminal to transmit to the RAN.

The more generalized RB access request message uses a similar one-phase RB resource request access, but supplies specific information about the type of RB resources being requested in one or more RLC data blocks transmitted by the mobile terminal once an uplink packet channel is assigned to it in response to the RB resource request message. Because the RB resource request message defines the request type as a RB resource request, the RAN is prepared to configure or otherwise identify the desired RB resources based on the subsequent RLC information from the mobile terminal.

DETAILED DESCRIPTION OF THE INVENTION

Figure 1:
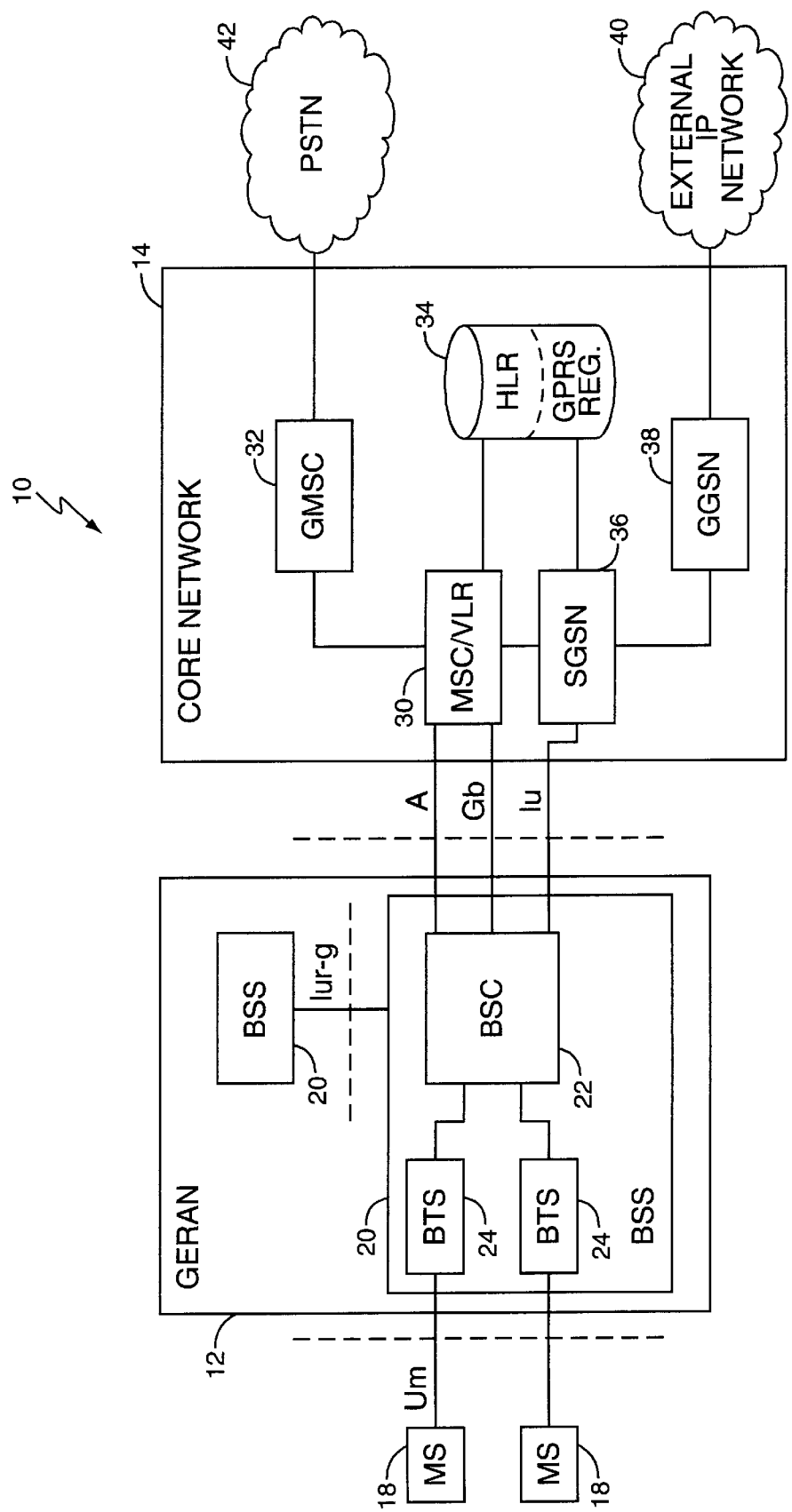
FIG. 1 is a diagram of an exemplary GERAN-based communication network.

The present invention will be described in the context of a 3G mobile communication network, such as a GSM EDGE network, shown in FIG. 1 and indicated generally by the numeral 10. The 3G network 10 comprises a GSM/EDGE radio access network (GERAN) 12 and a core network 14. The GERAN 12 and core network 14 provide communication and control for a plurality of mobile terminals 18.

The GERAN 12 typically comprises one or more base station subsystems (BSSs) 20. Each BSS 20 comprises a base station controller (BSC) 22 and one or more base transceiver stations (BTSs) 24. The BTSs 24 comprise the antennas, RF equipment, and baseband processing circuits needed to communicate with mobile terminals 18. The BSC 22 connects the BTSs 20 to the core network 14 and performs most control and management functions for the GERAN 12. An important function performed by the BSC 22 is managing the radio resources used by the BTSs 20 and mobile terminals 18. The BSC 22 connects to the core network 14 through the A, Gb, and Iu interfaces. The A and Gb interfaces between the core network 14 and the GERAN 12 are used to support communications with second-generation mobile terminals 18 that are not Iu-mode capable. The Iu interface supports communications with Iu-mode capable mobile terminals 18.

The core network 14 typically comprises at least one mobile switching center (MSC) 30, which may include a visitor location register (VLR), a Gateway MSC (GMSC) 32, a GPRS home location register (HLR) 34, at least one Serving GPRS Support Node (SGSN) 36, and one or more Gateway GPRS Support Nodes (GGSN) 38. The core network 14 provides both circuit-switched and packet data communication with various external networks, typically including the Public Switched Telephone Network (PSTN) 42, and one or more packet data networks 40, such as the Internet. MSC 30 and GMSC 32 handle circuit-switched communications via the A/Gb interfaces, while SGSN 36 and GGSN 38 handle packet-switched communications via the Iu interface. Detailed discussions of the core network 14 are readily available in the relevant GPRS and GSM/EDGE standards, but such information is not material to understanding the present invention.

In general, the 3G network 10 provides both voice and data services to mobile terminals 18. Voice services typically involve the transmission of speech between mobile terminal users and any telephone subscribers accessible through the PSTN 40. Data services involve the transmission of data, such as text, images, facsimile, and computer files. To provide these services, signaling is required to establish, maintain, and terminate connections or communication links between the mobile terminals 18 and the 3G network 10. Packet-related data communication involves the transfer of packet data between the core network 14 and one or more packet data networks 40. Signaling is needed to implement communication protocols that ensure the orderly exchange of information. In a 3G network 10, the signaling overhead is great, though transparent to the end user.

Figure 2:
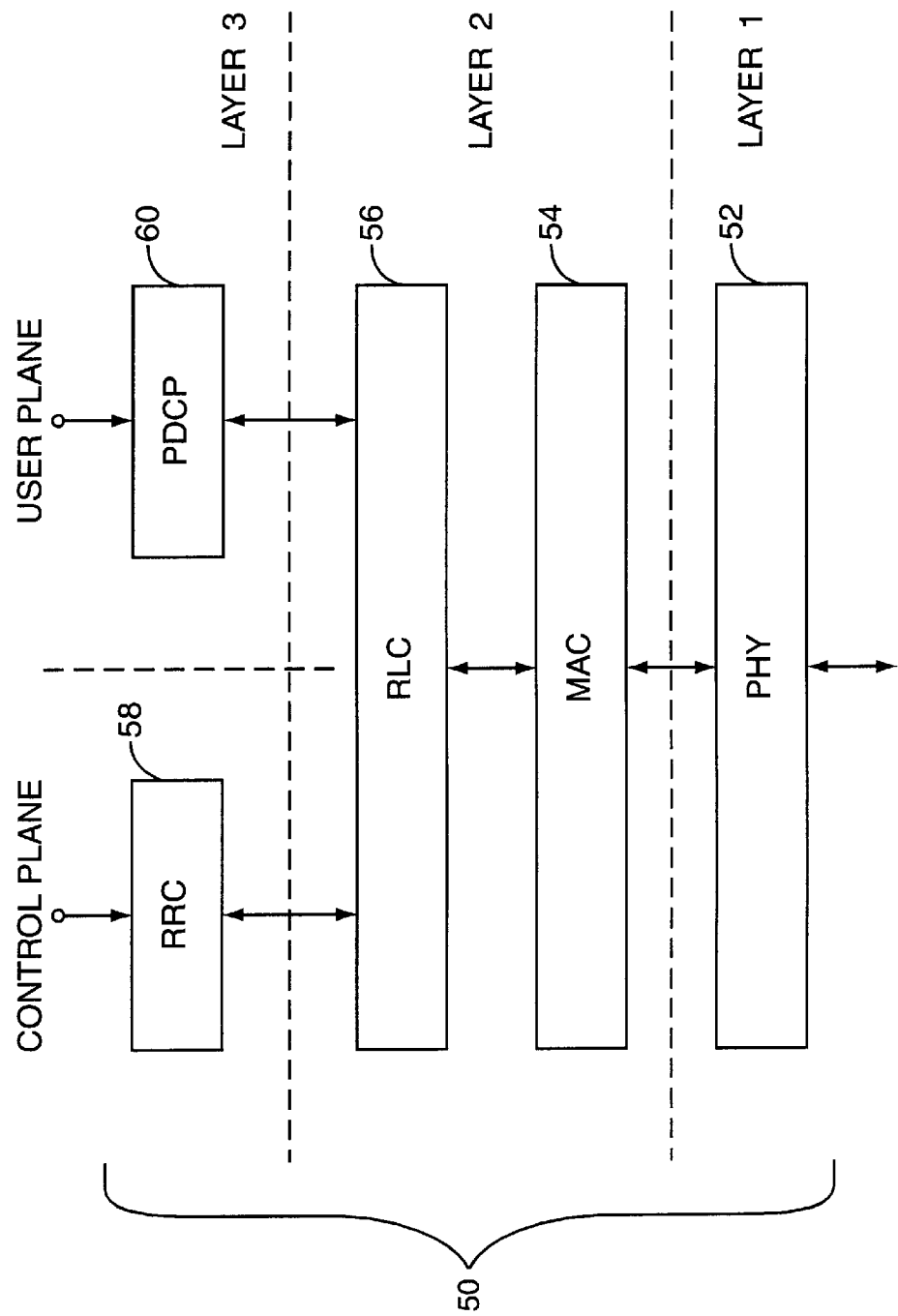
FIG. 2 is a diagram of a simplified protocol stack for a GERAN.

FIG. 2 provides a simplified illustration of the protocol stack 50 used to exchange signaling messages between a mobile terminal 18 and the GERAN 12. Protocol stack 50 represents the protocols used for packet-switched communications. A different protocol stack (not shown) is used in the exemplary embodiment for circuit-switched communications. The protocol stack 50 is divided into control and user planes. The control plane carries control signaling between the mobile terminal 18 and GERAN 12. The user plane carries user data. The protocol stack includes a physical layer (layer 1), a data link layer (layer 2), and a network layer (layer 3).

The physical layer 52 is responsible for converting data signals into a bit stream suitable for transmission over the physical channel. The physical layer involves the operation of physical radio resources such as specific radio frequency transmitters and receivers (not shown).

The data link layer is divided into sublayers: the Medium Access Control (MAC) protocol layer 54, and the Radio Link Control (RLC) protocol layer 56. The MAC and RLC protocol layers 54 and 56, respectively, and the physical layer 52 carry data from both the control and user planes. The MAC layer 54 allows transmission over the physical layer 52 of upper layer packet data units (PDUs) from one mobile terminal 18 when operating on a dedicated physical subchannel, or one or more mobile terminals 18 when operating on a shared physical subchannel. The MAC layer 54 handles the access to and multiplexing onto the physical subchannel. The RLC layer 56 provides data transfer services to higher layer protocols. The data transfer may be transparent, acknowledged, or unacknowledged. Functions performed by the RLC layer 56 include segmentation of upper layer PDUs into RLC data blocks, reassembly of RLC data blocks into upper layer PDUs, link adaptation, and ciphering.

The network layer (layer 3) is also partitioned into sublayers, and includes the RRC layer 58 and the Packet Data Convergence Protocol (PDCP) layer 60. The PDCP layer 60 carriers user plane data and is not material to the present invention. The lowest control-plane related sublayer of the network layer is the RRC layer 58, which operates between mobile terminals 18 and the GERAN 12. The RRC layer 58 performs certain access stratum functions, such as radio resource management, and handles control plane signaling between mobile terminals 18 and the GERAN 12. Radio Mobility management (RMM) and Call Control (CC) are network layer functions that belong to the non-access stratum and are not material to understanding the present invention. These functions are typically performed in the core network 14 and are not shown in FIG. 2.

The RRC layer 58 plays a key role in radio resource management. Radio resource management (RRM) encompasses the functions needed to manage the radio resources used for communications between mobile terminals 18 and the GERAN 12. These functions are performed by the RRC sublayer. The responsibilities of the RRC layer 58 include channel assignment, power-level control, time alignment, and hand-over from one cell to another. The RRC layer 58 handles all the procedures necessary to establish, maintain, and release dedicated radio resources. The RRC layer 58 is also involved in establishing the various radio bearers used for control and communication between the GERAN 12 and the mobile terminals 18.

Two types of radio bearers are used by a mobile terminal 18 to communicate with the 3G network 10: signaling radio bearers (SRBs) and user radio bearers (URBs). URBs are used to transmit user data (e.g., voice, facsimile) to the core network 14 and beyond. URBs always have a specific Quality of Service (QoS) associated with them. Each mobile terminal 18 maintains a set of one or more URBs, each identified by a specific URB identifier (URB ID). The QoS associated with a given URB ID is unique within the context of the mobile terminal 18. That is, two mobile terminals 18 may use the same URB ID to identify a different QoS. Typically, URBs are pre-configured by the mobile terminal 18 prior to the actual need for the URB. Therefore, when a mobile terminal 18 subsequently requests a URB, the GERAN 12 will know the QoS for the URB based on the URB ID.

SRBs are used for control signaling between the mobile terminal 18 and GERAN 12. Resources for SRBs are set up, for example, whenever an RRC signaling procedure needs to be performed, and are released when the signaling procedure ends. Messages processed and consumed by RRC applications are referred to as access stratum (AS) messages. RRC signaling may also be used by non-access stratum (NAS) entities in the core network as a carriage service for NAS messages. Four different types of SRBs are currently defined, each having a specific QoS associated with it. The four types of SRBs have the same QoS requirements regardless of the mobile terminal 18 identity. That is, all mobile terminals 18 use the same four types of SRBs which provide the same QoS for each mobile terminal 18. Since RRC signaling is used extensively in the GERAN 12, radio resources required to realize a SRB should be allocated as quickly as possible to avoid delays and minimize processing overhead.

A mobile terminal 18 must first request the appropriate radio resources before transferring data between it and the GERAN 12. This process begins with the mobile terminal 18 accessing the GERAN 12 to request a signaling radio bearer (SRB).

The mobile terminal 18 may request a SRB for any number of reasons. All radio resource control (RRC) signaling between the mobile terminal 18 and the GERAN 12 is performed through one or more SRBs. The mobile terminal 18 may also require a SRB, for example, to configure one or more user radio bearers (URBs) that it may subsequently use for transferring data with the control network 14 or to obtain a physical subchannel on which to transmit user data on a pre-configured URB.

Typically, realizing a SRB entails a "two-phase" process for Iu-mode mobile terminals 18. The mobile terminal 18 first requests access to the GERAN 12, and then specifically requests SRB resources after it is assigned an uplink channel, which may be either a dedicated or a shared channel. Because of the critical timing involved in radio resource allocation (RRC processing) within the GERAN 12, the extended time associated with the two-phase SRB request-allocation process is undesirable.

Figure 3:
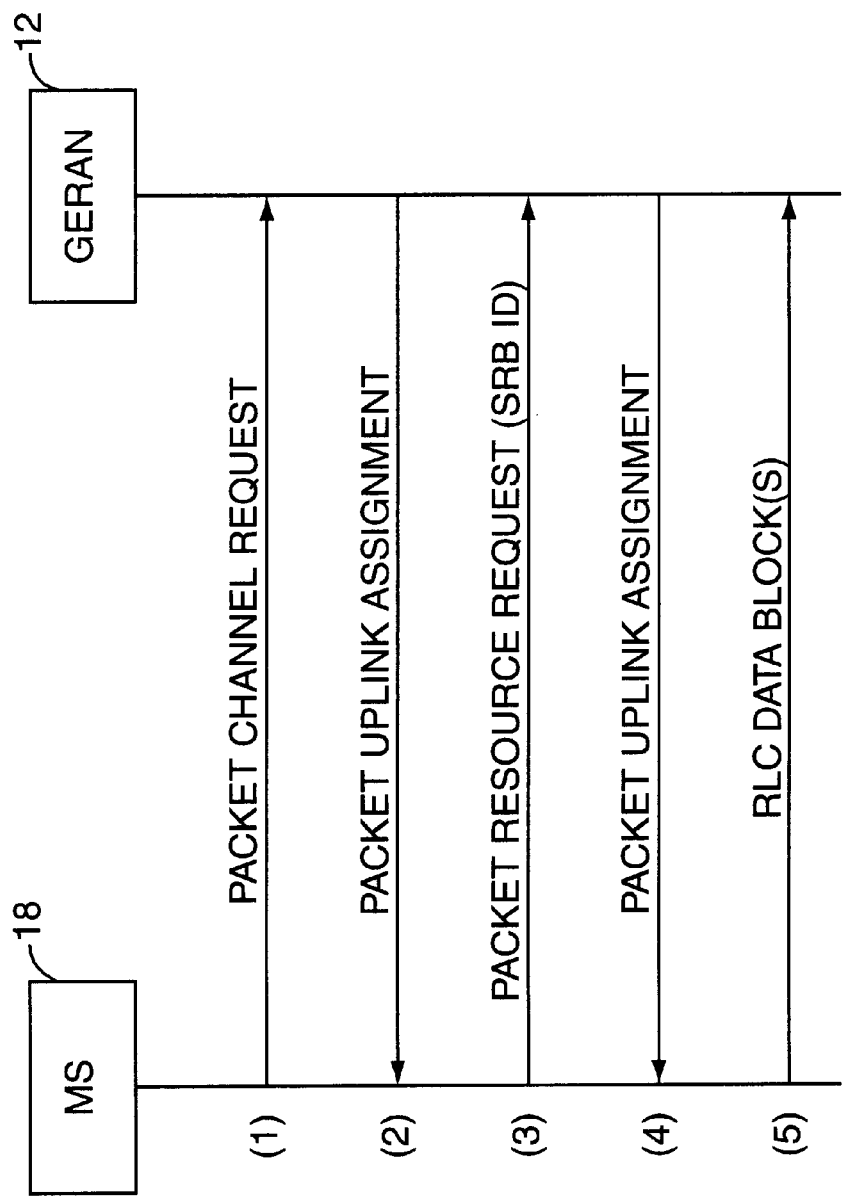
FIG. 3 is a diagram of conventional two-phase SRB resource request by a mobile terminal.

FIG. 3 illustrates the conventional two-phase process for SRB request and allocation. The mobile terminal 18 performs a contention-based access on the uplink of a Packet Common Control Channel (PCCCH). This involves the mobile terminal 18 accessing the GERAN 12 using a shared channel resource. Specifically, the mobile terminal 18 transmits a packet channel request to the GERAN 12 on a Packet Random Access Channel (PRACH), on which many mobile terminals 18 may be competing for access to the GERAN 12.

Assuming the given mobile terminal 18 wins the contention event with any competing mobile terminals 18 on the PRACH, it will have successfully transmitted its initial packet channel request to the GERAN 12 at (1). Within the context of FIG. 3, this initial request is "generic" in that it does not identify the specific type of resources being requested.

The GERAN 12 sends an initial packet uplink assignment at (2), which allocates physical and logical radio resources from within the GERAN 12 for the mobile terminal 18. The mobile terminal 18 receives this packet uplink assignment message, and uses the assigned packet uplink channel to specifically request SRB resources at (3). This entails specifying at least the type of SRB required, which is indicated by providing a SRB ID as part of the SRB resource request. Generally, there are four types of SRBs, often denoted as four distinct Quality of Service (QoS) designations. The different types relate to access stratum and non-access stratum SRBs, and include acknowledged and non-acknowledged communication configurations.

In response to receiving the SRB resource request from the mobile terminal 18, the GERAN 12 assigns needed radio resources and logical resources to the mobile terminal 18, and transmits the packet channel assignment information to the mobile terminal 18 at (4). Once the mobile terminal 18 receives the packet channel assignment information, it transmits RLC data block(s) to the GERAN 12 on the assigned uplink packet channel at (5). Once the necessary information is transmitted, the GERAN 12 generally de-allocates the involved SRB resources. Note that a SRB realized through the use of a previously established Dedicated Physical Signaling Channel (DPSCH) will not cause the release of the DPSCH once RRC signaling has been completed.

Figure 4:
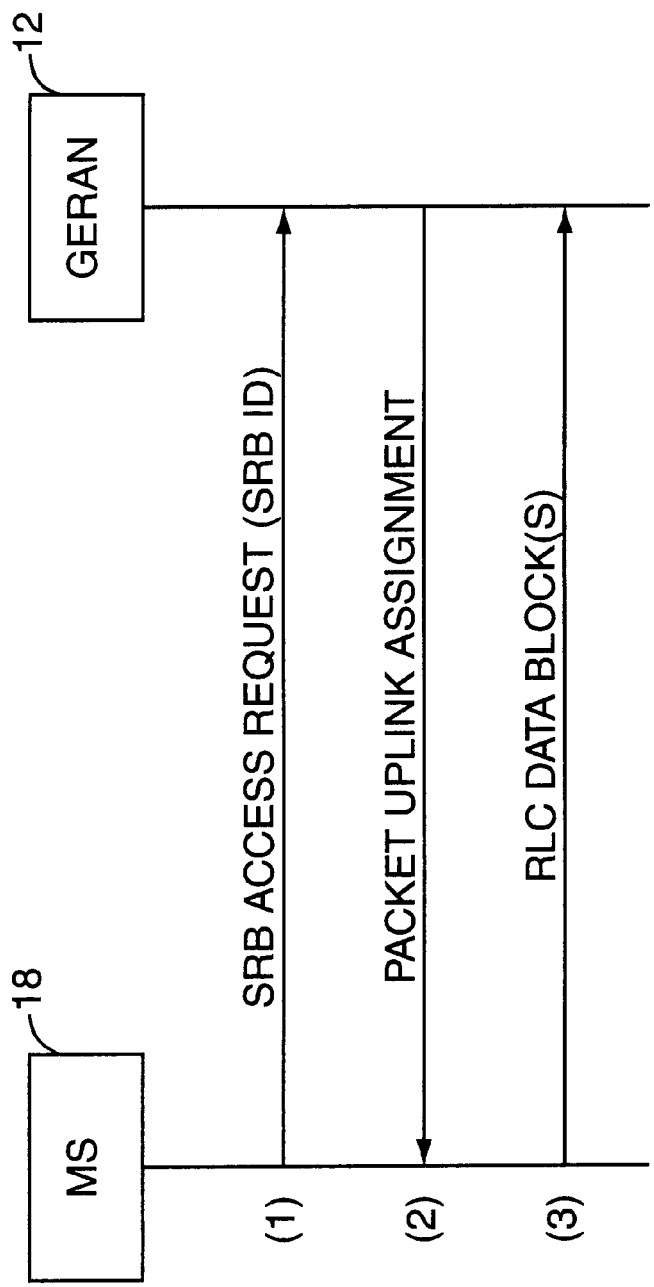
FIG. 4 is a diagram of an exemplary one-phase SRB resource request access in accordance with the present invention.

Optimizing SRB request transactions benefits the GERAN 12 by minimizing the overhead imposed in RRC processing, and benefits the mobile terminal 18 by reducing delays in gaining the needed SRB resources. FIG. 4 illustrates an exemplary embodiment of the optimized SRB resource request process of the present invention. A new message type allows the mobile terminal 18 to perform a "one-phase" SRB resource request. As applied to GERAN 12, the illustrated flow assumes the use of an Iu-mode mobile terminal 18. Within the GSM/EDGE RAN (GERAN) context, the present invention provides an expedited access mechanism for Iu-mode capable mobile terminals 18 wishing to realize a specific type of SRB for packet data communications.

The optimized access begins with the mobile terminal 18 transmitting a "SRB Access Request" message to the RAN on a PRACH at (1). The SRB Access Request implicitly identifies the mobile terminal 18 as Iu mode capable since the SRB Access Request is not used by other mobile terminals 18. Examples of suitable message formats for the SRB Access Request are defined in more detail later. In general, this optimized, "single-phase" access request accomplishes the dual purpose of alerting the GERAN 12 of the desired SRB access, while simultaneously identifying the specific type (QoS) of SRB desired. The GERAN 12 makes the needed logical and physical radio resource assignments necessary to realize the requested SRB by transmitting the packet uplink channel assignment message to the mobile terminal 18 at (2). The mobile terminal 18 receives the packet channel assignment information, and transmits RLC data blocks as needed at (3) using the assigned uplink packet channel. This data is transferred in accordance with the type of SRB requested at (1).

In the optimized SRB request scheme above, the mobile terminal 18 is assumed to begin with no allocated resources.

That is, the mobile terminal 18 initially vies for network access with other mobile terminals 18 on a shared packet channel resource. In more detail, the downlink packet control channel employs uplink state flags (USFs) to assign selected radio blocks on associated uplink packet channels to selected mobile terminals 18 sharing the uplink packet channels. Specific USF values are temporarily assigned to certain of the mobile terminals 18 using the packet uplink assignment message, and allow the GERAN 12 to identify which mobile terminal 18 should transmit on which radio blocks in the uplink packet channel. In the GSM/EDGE context, four time slots (one time slot from each of four consecutive TDMA frames) constitute a radio block. Thus, one radio block spans four TDMA frames, two blocks span eight frames, and so on.

The GERAN 12 also provides an opportunity for any number of mobile terminals 18 to compete for access during certain radio blocks by setting the USF to a predetermined value indicating that all mobile terminals 18 are free to attempt access on a contention basis on the uplink channel during specific uplink bursts. Thus, in the context of FIG. 4, the mobile terminal 18 is assumed to be competing with other mobile terminals 18 for access to the GERAN 12 in this limited bandwidth, contention-access environment. As such, the SRB resource request message offers significant advantages in that it minimizes RRC processing overhead, and provides a compact mechanism for the mobile terminal 18 to alert the GERAN 12 of its need for a specific type of SRB in a single access pass.

Figure 5A:
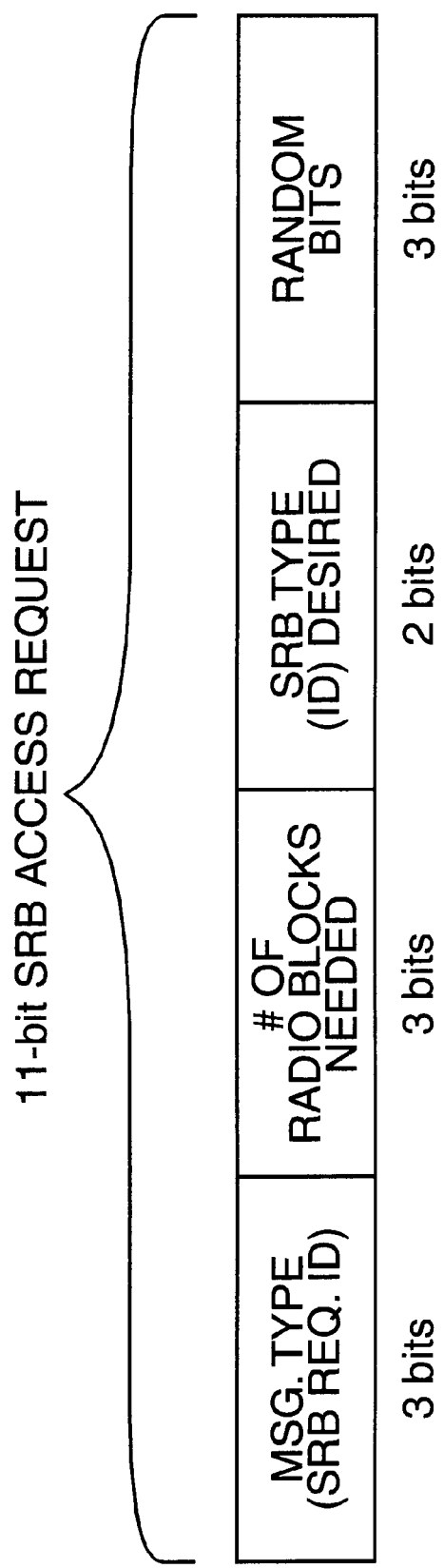
FIG. 5A is a diagram of an exemplary 11-bit SRB access request message.

Variations on the SRB access request are possible, although two exemplary message implementations are contemplated for the GSM/EDGE GERAN 12 discussed above. FIG. 5A illustrates an 11-bit version of the SRB access request message used in the present invention. The message block includes a 3-bit block used to identify the message type as a "SRB Access Request." For example, the value '101' for the Message Type Field may be used to identify an access request message as a SRB access request. The message further includes a two-bit block used to specify the specific type of SRB desired by the mobile terminal 18. These two pieces of information accomplish the dual purpose of specifying the type of radio bearer desired (i.e., SRB), as well as identifying the specific SRB type desired (i.e., SRB ID), and also implicitly indicating that the mobile terminal 18 is Iu capable.

The message further comprises a 3-bit block used to indicate the number of radio blocks that will be initially needed by the mobile terminal 18 to transmit the desired RLC data blocks. Also included, are random bits set in random fashion by the mobile terminal 18 that allow the GERAN 12 to distinguish between multiple SRB access request messages sent simultaneously by multiple mobile terminals 18.

Figure 5B:
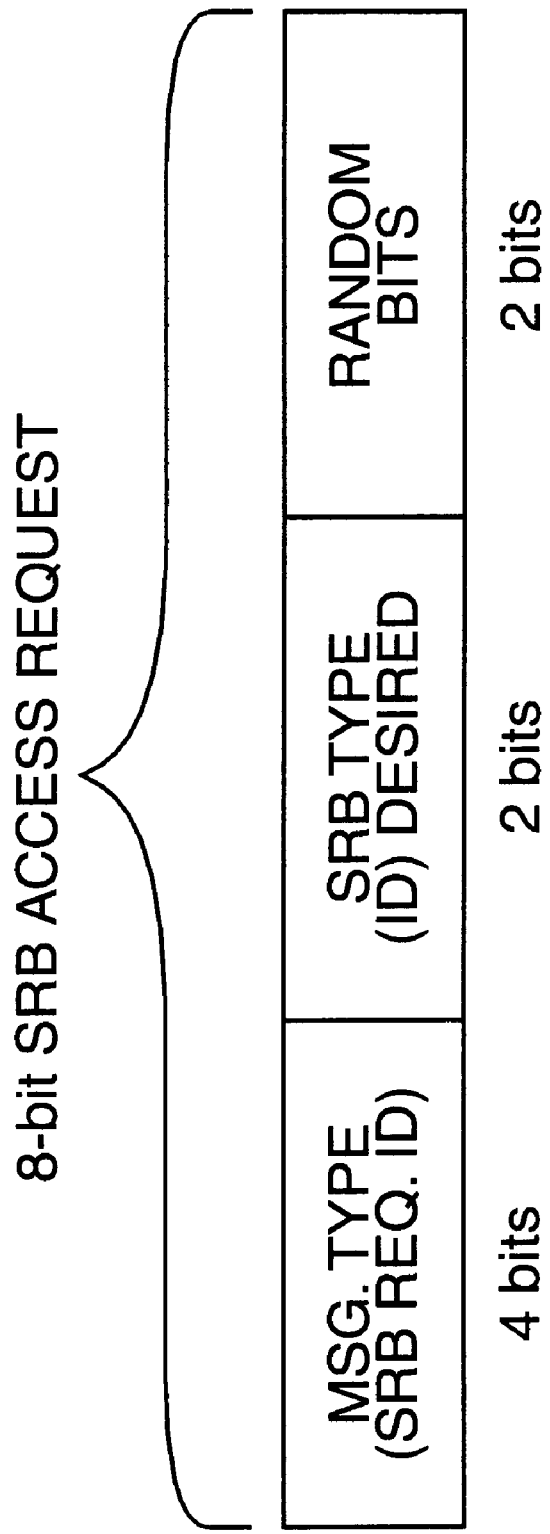
FIG. 5B is a diagram of an exemplary 8-bit SRB access request message.

FIG. 5B illustrates an exemplary 8-bit SRB access request message format. In the 8-bit format, the number of random bits is reduced from three to two, the radio block indicator bits are eliminated, and the request type identification bits increases from three to four. Note that the message diagrams in FIGS. 5A and 5B do not necessarily depict a specific bit order for message transmission.

Existing "Packet Channel Request" messages defined in GSM may accommodate the SRB access request messages above, in both the 11 and 8-bit formats. The GSM standard document, GSM 04.60, v8.3.0, defines both 11 and 8-bit format packet channel requests, and is incorporated herein by reference. By defining a new message type (i.e., SRB Access Request), the existing Packet Channel Request message defined in the GSM standard can be used to transmit a SRB Access Request. In the disclosed embodiment, the message type identifier for a SRB access request message sent using an 11-bit SRB Access Request is 101, which is placed in the Message Type field of the Packet Channel Request message. This new message type identifier indicates to the GERAN 12 that the PLR message is a SRB access request. The 8-bit version of the SRB Access Request includes a message-type identifier of 0111.

Tables 1 and 2 below illustrate an augmented message set based on the existing GSM standard for both 11 and 8-bit Packet Channel Request messages. The message sets include the message types defined by the existing standard (e.g., two phase access request, page response), as well as the new message type (i.e., SRB access request) according to the present invention:

TABLE 1

11-bit Packet Channel Request Message

| Message Type Description | Message Type (ID) | Message Payload | |
|---|---|---|---|
| One Phase Access Request | 0 | MultislotClass Priority RandomBits | bit (5) bit (2) bit (3) |
| Short Access Request | 100 | NoOfBlocks Priority RandomBits | bit (3) bit (2) bit (3) |
| SRB Access Request | 101 | NoOfBlocks SRB ID RandomBits | bit (3) bit (2) bit (2) |
| Two Phase Access Request | 110000 | Priority RandomBits | bit (2) bit (3) |
| Page Response | 110001 | RandomBits | bit (5) |
| Cell Update | 110010 | RandomBits | bit (5) |
| MM Procedure | 110011 | RandomBits | bit (5) |
| Single Block Without TBF Establishment | 110100 | RandomBits | bit (5) |

TABLE 2

8-bit Packet Channel Request Message

| Message Type Description | Message Type (ID) | Message Payload | |
|---|---|---|---|
| One Phase Access Request | 1 | MultislotClass RandomBits | bit (5) bit (2) |
| Short Access Request | 00 | NoOfBlocks RandomBits | bit (3) bit (3) |
| Two Phase Access Request | 01000 | RandomBits | bit (3) |
| Page Response | 01001 | RandomBits | bit (3) |
| Cell Update | 01010 | RandomBits | bit (3) |
| MM Procedure | 01011 | RandomBits | bit (3) |
| Single Block Without TBF Establishment | 01100 | RandomBits | bit (3) |
| SRB Access Request | 0111 | SRB ID RandomBits | bit (2) bit (2) |

In Table 1, the newly added SRB Access Request identifier and associated SRB type information may be seen (i.e., SRB ID). In Table 2, only the newly added SRB Access Request identifier may be seen.

Of course, the present invention may be practiced in other ways within the context of the GERAN environment discussed above, as well as within other types of radio access networks, such as in systems based on the Universal Mobile Telecommunications System (UMTS) standards. The UMTS standards are a part of the International Telecommunications Union's 'IMT-2000' efforts at defining global standards for 'third-generation' (3G) mobile communications systems.

An exemplary variation of the present invention involves defining a generic radio bearer (RB) access request function, referred to as a "RB Access Request" message. As above, the RB access request message may be implemented as a specific type of Packet Channel Request message. The RB access request message follows the one-phase message flow sequence illustrated in FIG. 4, but allows the mobile terminal 18 to request any type of RB resources. Since each type of RB has a predefined QoS, the RB type identifier tells the GERAN 12 what QoS is needed for the RB. Thus, the RB access request message permits the mobile terminal 18 to make one-phase access requests for URBs as well as SRBs.

Figure 6:
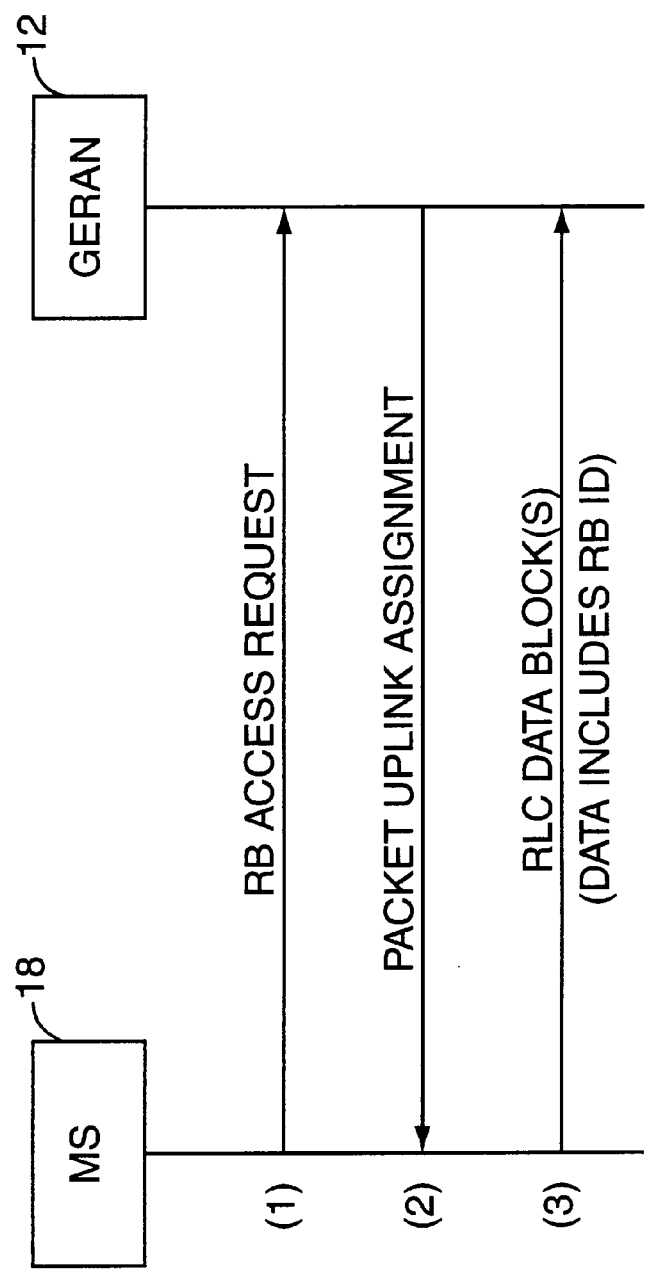
FIG. 6 is a diagram of an exemplary one-phase RB resource request access in accordance with the present invention.

Referring to FIG. 6, the mobile terminal 18 transmits a "RB Access Request" message at (1), rather than transmitting a "SRB Access Request" message. The RB access request message identifies the mobile terminal 18 as being lu-mode capable. The GERAN 12 assigns generic RB resources to the mobile terminal 18 by transmitting an uplink packet channel assignment to the mobile terminal 18 at (2). The first RLC data block sent by the mobile terminal 18 on the assigned uplink packet channel includes a specific RB ID value (SRB ID or URB ID) as part of the RLC protocol header. This information enables the GERAN 12 to determine the applicable QoS (implied by the RB ID) and modify the allocated RB resources, if necessary, in accordance with the RB ID, which implicitly identifies the type of RB resources. Thus, the mobile terminal 18 realizes the specific type of RB resource desired.

The RB access request message may be implemented in both 11 and 8-bit formats, as discussed in Tables 1 and 2 earlier herein. The RB Access Request message in the 11-bit and 8-bit Packet Channel Request variations are shown in Tables 3 and 4 below:

TABLE 3

11-bit Packet Channel Request Message

| Message Description | Message Type (ID) | Message Payload | |
|---|---|---|---|
| RB Access Request | 101 | NoOfBlocks | bit (3) |
| | | RandomBits | bit (5) |

TABLE 4

8-bit Packet Channel Request Message

| Message Description | Message Type (ID) | Message Payload | |
|---|---|---|---|
| RB Access Request: | 0111 | Reserved | bit (1) |
| | | RandomBits | bit (3) |

Figure 7A:
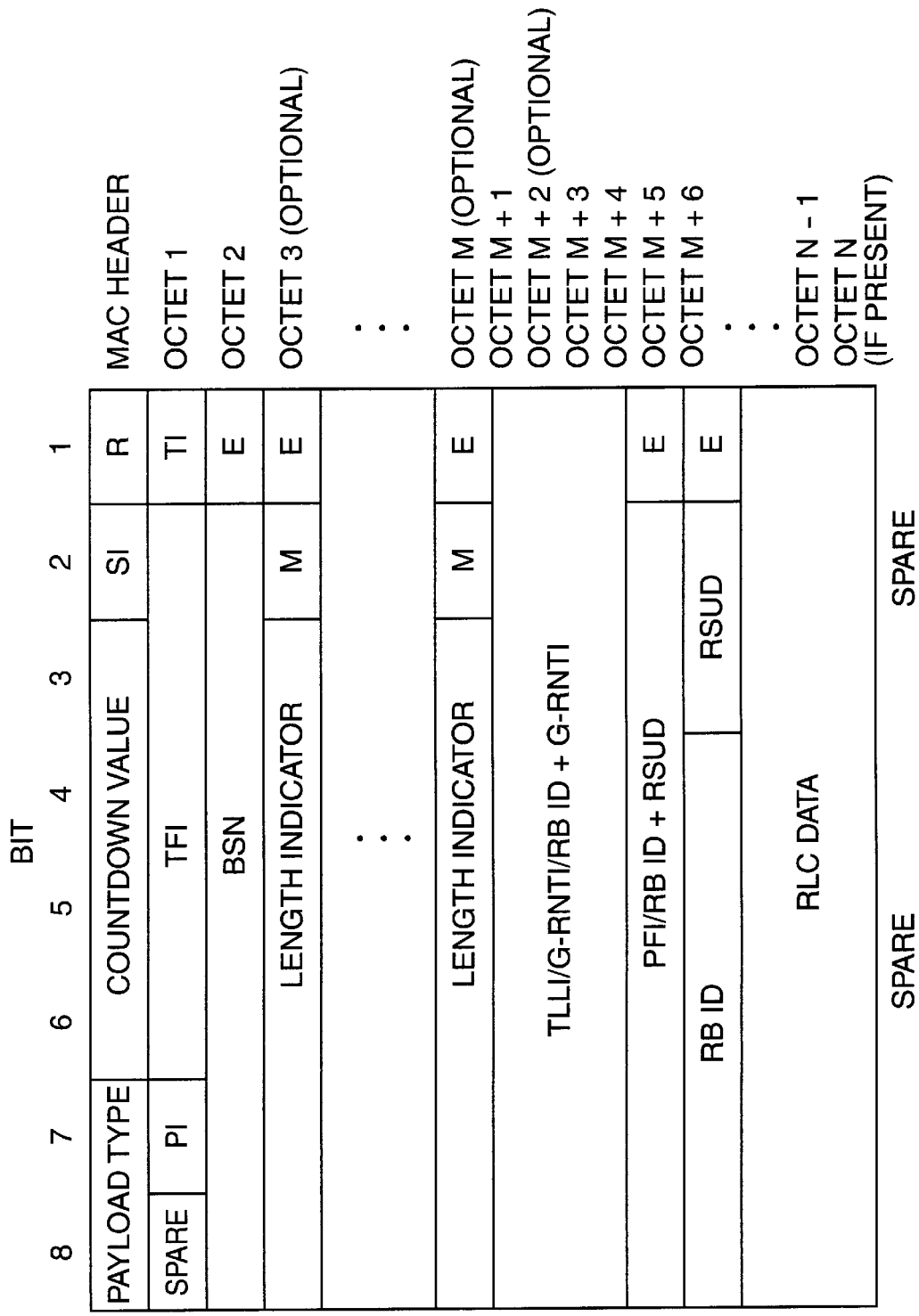
FIG. 7A is a diagram of an exemplary uplink GPRS RLC data block with MAC and RLC header.
Figure 7B:
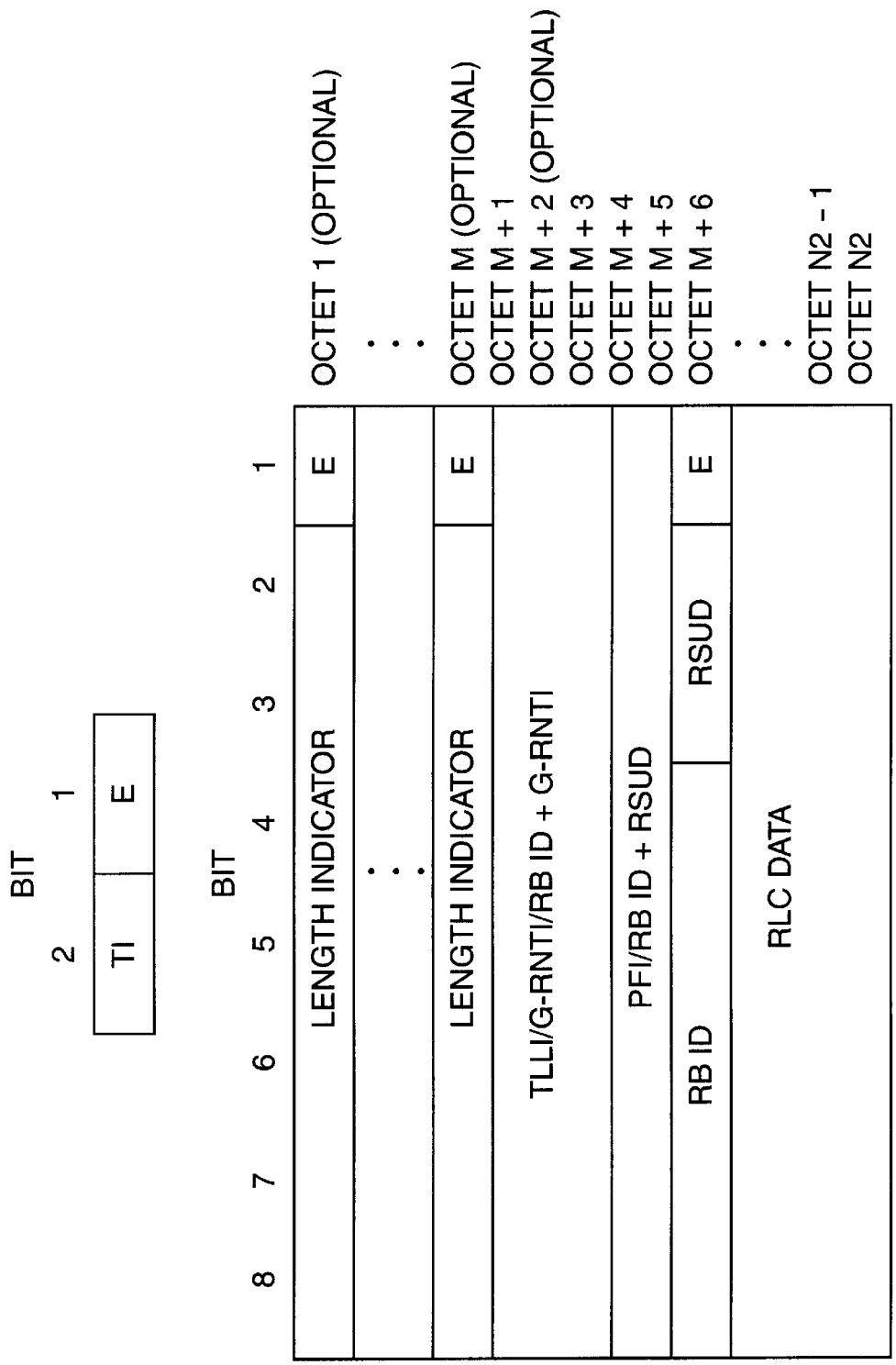
FIG. 7B is a diagram of an exemplary uplink EGPRS RLC data block.

As noted above, the mobile terminal 18 identifies the specific type of RB resource by including a RB ID value in the header of one or more RLC data blocks transmitted on the uplink channel. FIGS. 7A and 7B illustrate modification of the GPRS RLC and EGPRS RLC data block headers, respectively, as transmitted by the mobile terminal 18 in association with the "RB Access Request" message. Since the "RB Access Request" message indicates that the mobile terminal 18 is lu-mode capable, the GERAN 12 interprets the existing 32-bit TLLI field as a 32-bit GERAN-specific identity known as G-RNTI (GERAN Radio Network Temporary Identifier). Also, based on indication of lu-mode capability, the GERAN 12 interprets the existing 7-bit PFI field as a 5-bit radio bearer identification (RB ID) field followed by a 2-bit Reserved field. Note that the value of RB ID implicitly indicates whether or not a SRB or a URB is being realized.

In another variation, again with reference to FIGS. 7A and 7B, the GERAN 12, upon receiving the "RB Access Request" message from the mobile terminal 18, interprets the existing 32-bit TLLI field as a 5-bit RB ID field followed by a 27-bit GERAN-specific G-RNTI. Here, too, the value of RB ID implicitly indicates whether or not a SRB or a URB is being realized.

In still another variation, again with reference to FIGS. 7A and 7B, the GERAN 12, upon receiving the "RB Access Request" message from the mobile terminal 18, interprets the existing 32-bit TLLI field as a 32-bit GERAN-specific G-RNTI, and a new optional RLC protocol field called "RB ID" would be defined. The RB ID, when included, is contained in the octet immediately following the octet containing the existing PFI field. The octet containing the RB ID field would also include a 2-bit "Reserved" field and a 1-bit "E" field allowing for additional future enhancements to this protocol. Note that the value of RB ID implicitly indicates whether or not a SRB or a URB is being realized.

The present invention may, of course, be carried out in other specific ways than those herein set forth without departing from the scope and essential characteristics of the invention. In general, the present invention permits a mobile terminal to make a one-phase RB resource request of the supporting radio access network. This optimized request operation significantly reduces RRC processing overhead and RB assignment delay. The present embodiments are therefore to be construed in all aspects as illustrative and not restrictive, and all changes coming within the meaning and equivalency of the appended claims are intended to be embraced herein.

What is claimed is:

1. A method of establishing a signaling radio bearer (SRB) for control signaling between a mobile terminal and a radio access network, the method comprising:

transmitting an access request message from said mobile terminal to said radio access network, said access request message comprising a SRB resource request that identifies the type of SRB being requested;

receiving an uplink assignment message from said radio access network responsive to said SRB resource request, said uplink assignment message allocating specified SRB resources to said mobile terminal; and transmitting control signaling messages from said mobile terminal to said radio access network using said specified SRB resources allocated to said mobile terminal in said uplink assignment message.

2. The method of claim 1 further comprising including a message-type identifier in said access request message to indicate that said access request message comprises a SRB resource request.

3. The method of claim 2 further comprising including a SRB identifier in said access request message to indicate the type of SRB being requested.

4. The method of claim 1 wherein transmitting said access request message from said mobile terminal to said radio access network comprises transmitting said access request message on a contention-based random access channel.

5. The method of claim 4 wherein said radio access network comprises a GSM-EDGE radio access network and wherein transmitting said access request message on a contention-based random access channel comprises transmitting said access request message on an uplink packet control channel.

6. A mobile terminal comprising:

a transceiver to communicate with a radio access network;

a controller operatively connected to said transceiver, said controller programmed to:

send an access request message via said transceiver to said radio access network to establish a signaling radio bearer (SRB), said access request message comprising a SRB resource request that identifies the type of SRB being requested;

receive an uplink assignment message from said radio access network via said transceiver, said uplink assignment message responsive to said access request message allocating specified SRB resources to said mobile terminal; and transmit control signaling via said transceiver to said radio access network using said specified SRB resources allocated to said mobile terminal in said uplink assignment message.

7. The mobile terminal of claim 6 wherein said access request message sent to said radio access network comprises a message-type identifier to indicate that said access request message is a SRB resource request.

8. The mobile terminal of claim 7 wherein said access request message sent to said radio access network comprises a SRB identifier to indicate the type of SRB being requested.

9. The mobile terminal of claim 6 wherein said access request message is sent to said radio access network on a contention-based random access channel.

10. The mobile terminal of claim 9 wherein said radio access network is a GSM-EDGE radio access network and wherein said access request message is sent to said radio access network on an uplink packet control channel.

11. A method of establishing a signaling radio bearer (SRB) for control signaling between a mobile terminal and a radio access network, the method comprising:

receiving an access request message from said mobile terminal at said radio access network, said access request message comprising a SRB resource request that identifies the type of SRB being requested by said mobile terminal;

allocating selected SRB resources to said mobile terminal responsive to said SRB resource request;

transmitting an uplink assignment message to said mobile terminal to notify said mobile terminal of said selected SRB resources allocated to said mobile terminal; and receiving control signaling messages from said mobile terminal at said radio access network using said selected SRB resources allocated to said mobile.

12. The method of claim 11 further comprising determining whether said access request message received at said radio access network is a SRB resource request based on a message-type identifier contained in said access request message.

13. The method of claim 12 further comprising determining the type of SRB being requested by said mobile terminal based on a SRB identifier contained in said access request message.

14. The method of claim 11 wherein receiving said access request message from said mobile terminal at said radio access network comprises receiving said access request message on a contention-based random access channel.

15. The method of claim 14 wherein said radio access network comprises a GSM-EDGE radio access network and wherein receiving said access request on a contention-based random access channel comprises receiving said access request on an uplink packet control channel.

16. A radio access network comprising:

at least one base transceiver station to communicate with a mobile terminal;

a base station controller operatively connected to said base transceiver station, said base station controller programmed to:

receive an access request message via said base transceiver station from said mobile terminal requesting a signaling radio bearer (SRB), said access request message comprising a SRB resource request that identifies the type of SRB being requested;

allocate selected SRB resources to said mobile terminal responsive to said SRB resource request;

transmit an uplink assignment message via said base transceiver station to said mobile terminal to notify said mobile terminal of the selected SRB resources allocated to said mobile terminal; and receive control signaling messages via said base transceiver station from said mobile terminal using said specified SRB resources allocated to said mobile terminal.

17. The mobile terminal of claim 16 wherein said access request message received by said radio access network comprises a message-type identifier indicating that said access request message is a SRB resource request.

18. The radio access network of claim 17 wherein said access request message received by said radio access network comprises a SRB identifier indicating the type of SRB being requested.

19. The radio access network of claim 16 wherein said access request message is received by said radio access network on a contention-based random access channel.

20. The radio access network of claim 19 wherein said radio access network comprises a GSM-EDGE radio access network, and wherein said access request message is received by said radio access network on an uplink packet control channel.

21. A method of establishing a signaling radio bearer (SRB) for signaling between a mobile terminal and a radio access network (RAN), the method comprising:

transmitting an access request message comprising a SRB resource request from said mobile terminal to said radio access network to request SRB resources for subsequent communication with said RAN;

receiving an uplink assignment message at said mobile terminal from said radio access network responsive to said SRB resource request and allocating selected SRB resources to said mobile terminal; and transmitting data blocks from said mobile terminal to said radio access network using said selected SRB resources wherein a selected one of said data blocks transmitted to said radio access network comprises a RB identifier that identifies a type of RB being requested by said mobile terminal.

22. The method of claim 21 further comprising including a message-type identifier into said access request message to indicate that said access request message comprises a RB resource request.

23. The method of claim 22 wherein said RB identifier identifies a user radio bearer previously configured by said mobile terminal.

24. The method of claim 22 wherein said RB identifier identifies a signaling bearer previously configured by said mobile terminal.

25. The method of claim 21 wherein transmitting said access request message from said mobile terminal to said radio access network comprises transmitting said access request message on a contention-based random access channel.

26. The method of claim 25 wherein said radio access network comprises a GSM-EDGE radio access network and wherein transmitting said access request message on a contention-based random access channel comprises transmitting said access request message on an uplink packet control channel.

27. A mobile terminal comprising:
a transceiver to communicate with a radio access network;
a controller operatively connected to said transceiver, said controller programmed to:
send an access request message containing a SRB resource request via said transceiver to said radio access network to establish a signaling radio bearer (SRB);
receive an uplink assignment message from said radio access network via said transceiver, said uplink assignment message responsive to said SRB resource request allocating selected SRB resources to said mobile terminal; and
transmit one or more data blocks via said transceiver to said radio access network using said selected SRB resources, wherein a selected one of said data blocks transmitted to said radio access network contains a RB identifier that identifies a type of RB resources requested by said mobile terminal.

28. The mobile terminal of claim 27 wherein said access request message sent to said radio access network comprises a message-type identifier to indicate that said access request message is a SRB resource request.

29. The mobile terminal of claim 27 wherein said RB identifier identifies a user radio bearer previously configured by said mobile terminal.

30. The mobile terminal of claim 27 wherein said RB identifier identifies a signaling bearer previously configured by said mobile terminal.

31. The mobile terminal of claim 27 wherein said access request message is sent to said radio access network on a contention-based random access channel.

32. The mobile terminal of claim 31 wherein said radio access network is a GSM-EDGE radio access network and wherein said access request message is sent to said radio access network on an uplink packet control channel.

33. A method of establishing a signaling radio bearer (SRB) for signaling between a mobile terminal and a radio access network, the method comprising:
receiving an access request message containing a SRB resource request from said mobile terminal at said radio access network;
allocating selected SRB resources to said mobile terminal responsive to said SRB resource request;
transmitting an uplink assignment message to said mobile terminal to notify said mobile terminal of said selected SRB resources allocated to said mobile terminal; and
receiving one or more data blocks from said mobile terminal at said radio access network using said selected SRB resources, wherein a selected one of said data blocks received at said radio access networks contains a RB identifier that identifies a type of RB resources being requested by said mobile terminal.

34. The method of claim 33 further comprising determining whether said access request message received at said radio access network is a SRB resource request based on a message-type identifier contained in said access request message.

35. The method of claim 33 further comprising determining the type of RB being requested by said mobile terminal based on said RB identifier contained in said selected data block.

36. The method of claim 35 wherein said RB identifier identifies a user radio bearer previously configured by said mobile terminal.

37. The method of claim 35 wherein said RB identifier identifies a signaling bearer previously configured by said mobile terminal.

38. The method of claim 33 wherein receiving said access request message at said radio access network comprises receiving said access request message on a contention-based random access channel.

39. The method of claim 38 wherein said radio access network comprises a GSM-EDGE radio access network and wherein receiving said access request on a contention-based random access channel comprises receiving said access request on an uplink packet control channel.

40. A radio access network comprising:
at least one base transceiver station to communicate with a mobile terminal;
a base station controller operatively connected to said base transceiver station, said base station controller programmed to:
receive an access request message containing a signaling radio bearer (SRB) resource request via said base transceiver station from said mobile terminal;
allocate selected SRB resources to said mobile terminal responsive to said SRB resource request;
transmit an uplink assignment message via said base transceiver station to said mobile terminal to notify said mobile terminal of the selected SRB resources allocated to said mobile terminal; and
receive one or more data blocks via said base transceiver station from said mobile terminal using said selected SRB resources allocated to said mobile terminal, wherein a selected one of said data blocks contains a SRB identifier that identifies the type of SRB resources being requested by said mobile terminal.

41. The radio access network of claim 40 wherein said access request message received by said radio access network comprises a message-type identifier indicating that said access request message is a RB resource request.

42. The radio access network of claim 40 wherein said RB identifier identifies a user radio bearer previously configured by said mobile terminal.

43. The radio access network of claim 40 wherein said RB identifier identifies a signaling bearer previously configured by said mobile terminal.

44. The radio access network of claim 40 wherein said access request message is received by said radio access network on a contention-based random access channel.

45. The radio access network of claim 44 wherein said radio access network comprises a GSM-EDGE radio access network, and wherein said access request message is received by said radio access network on an uplink packet control channel.

* * * * *